Figure 1:
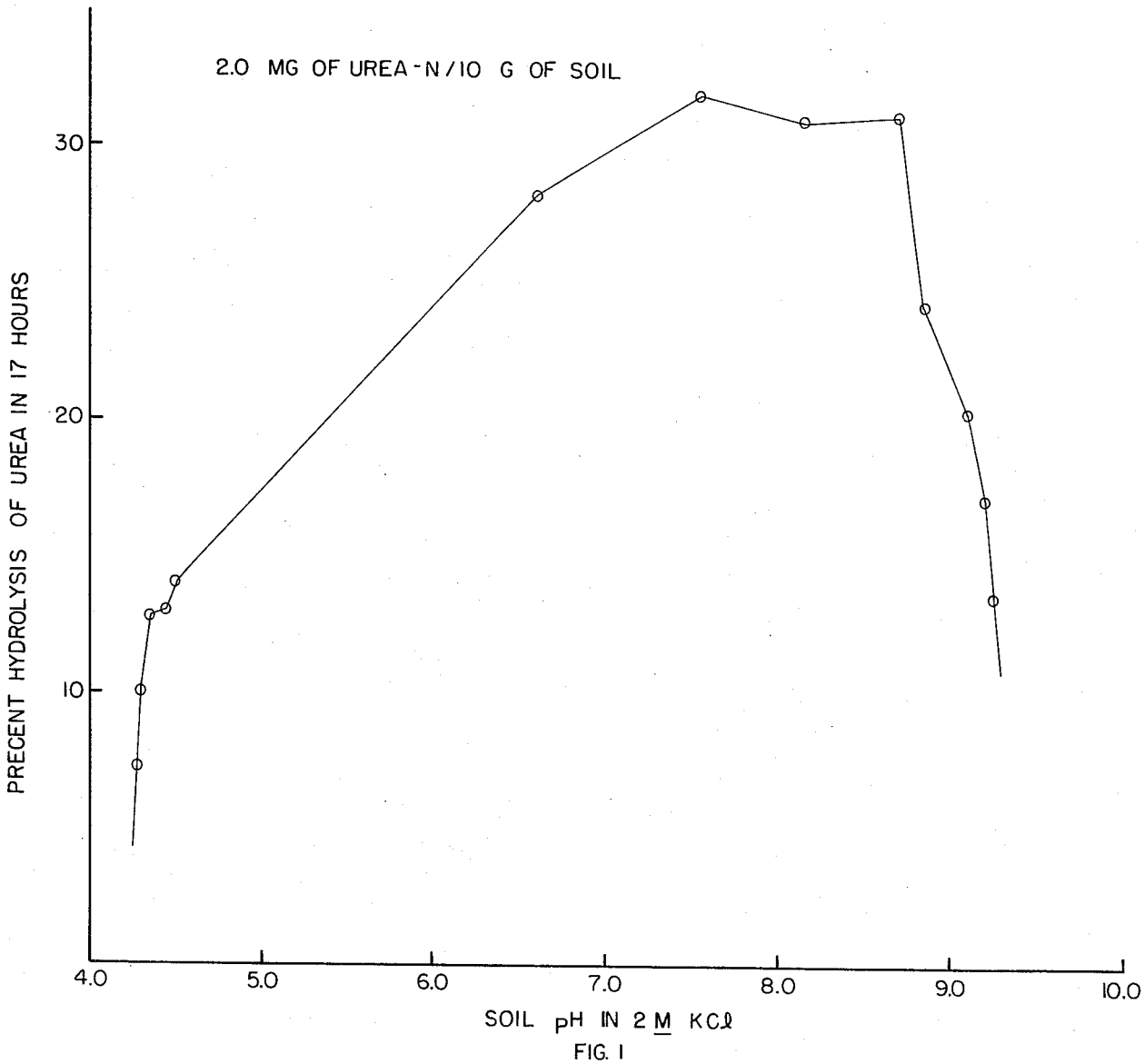
Figure 2:
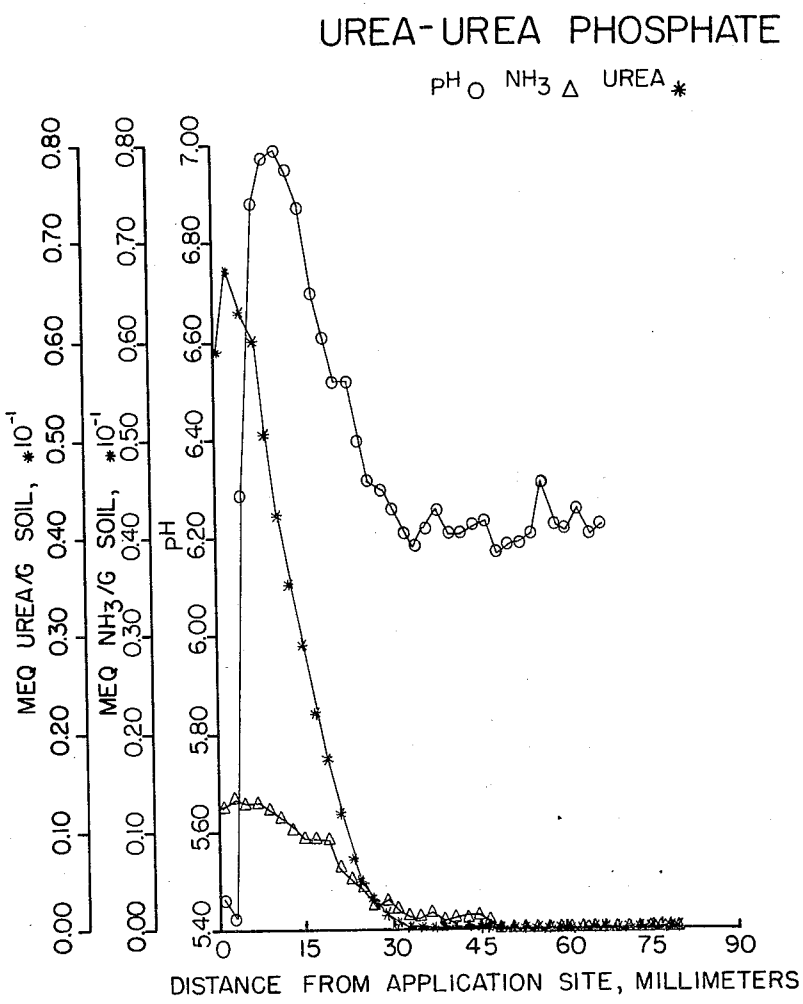
Figure 3:
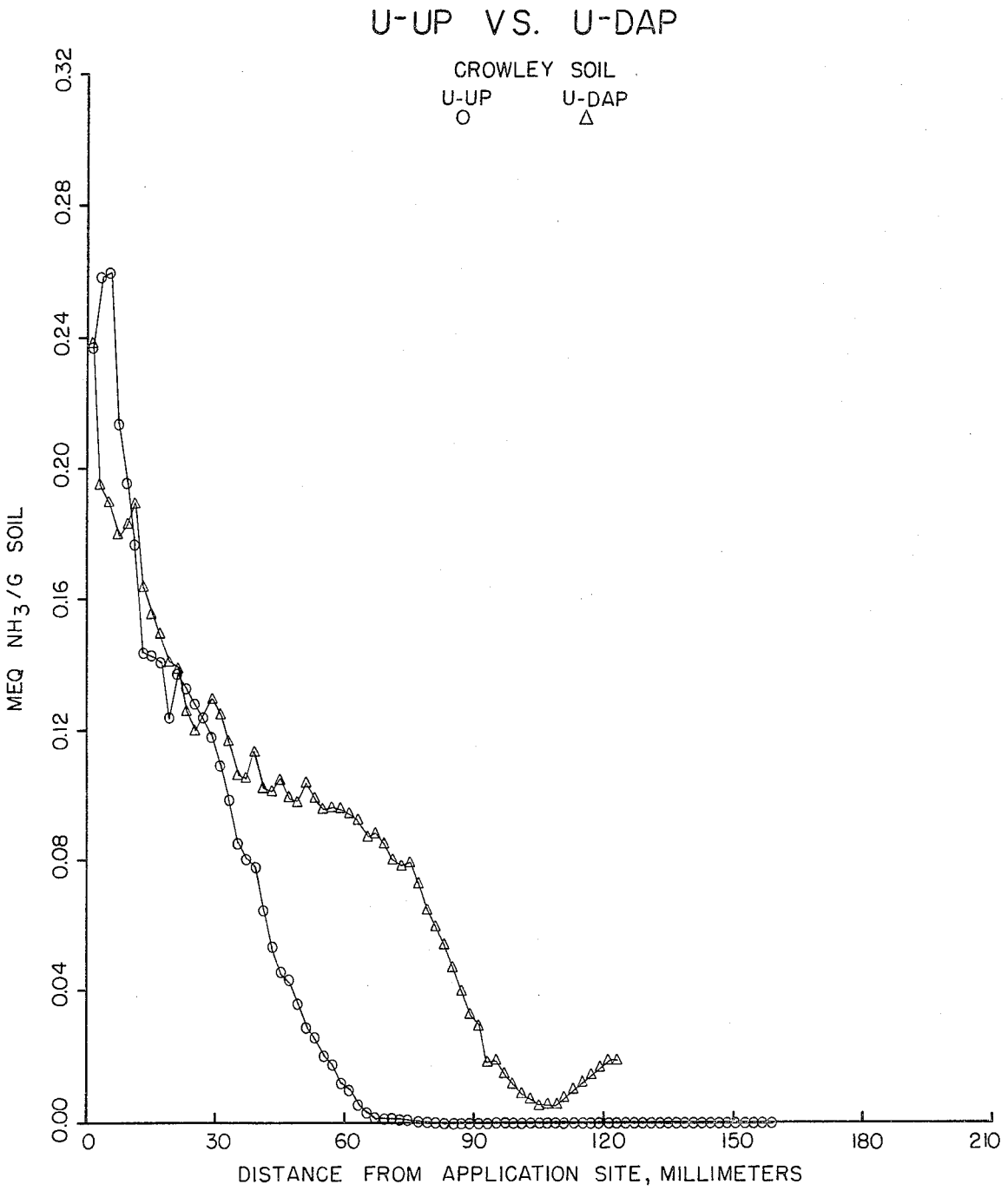
Figure 4:
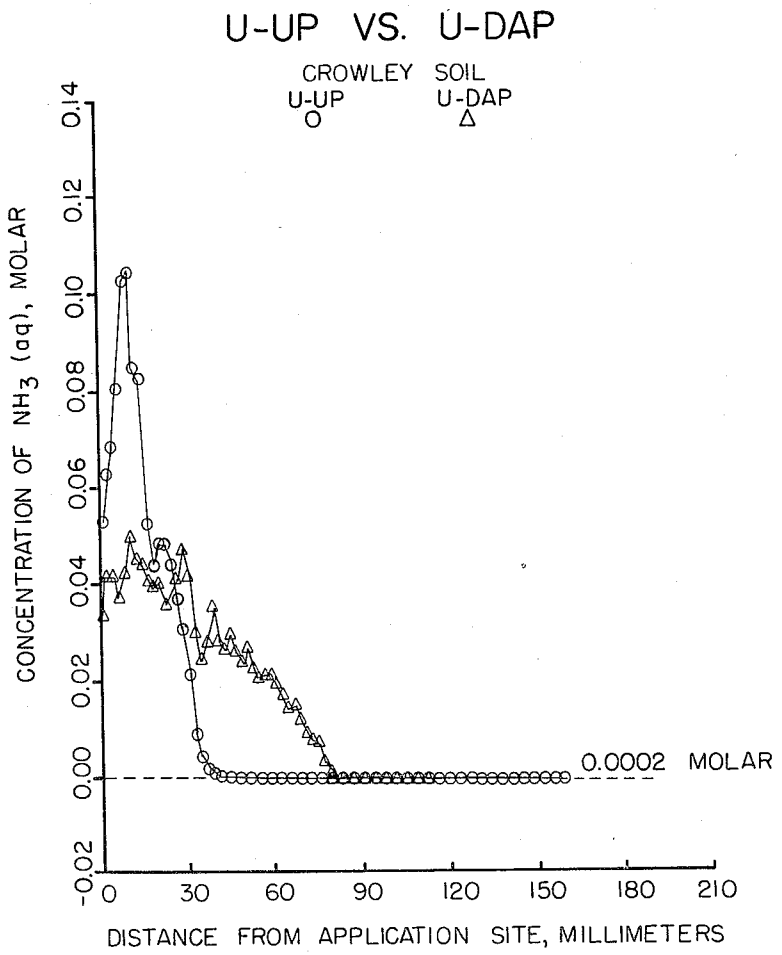
Figure 5:
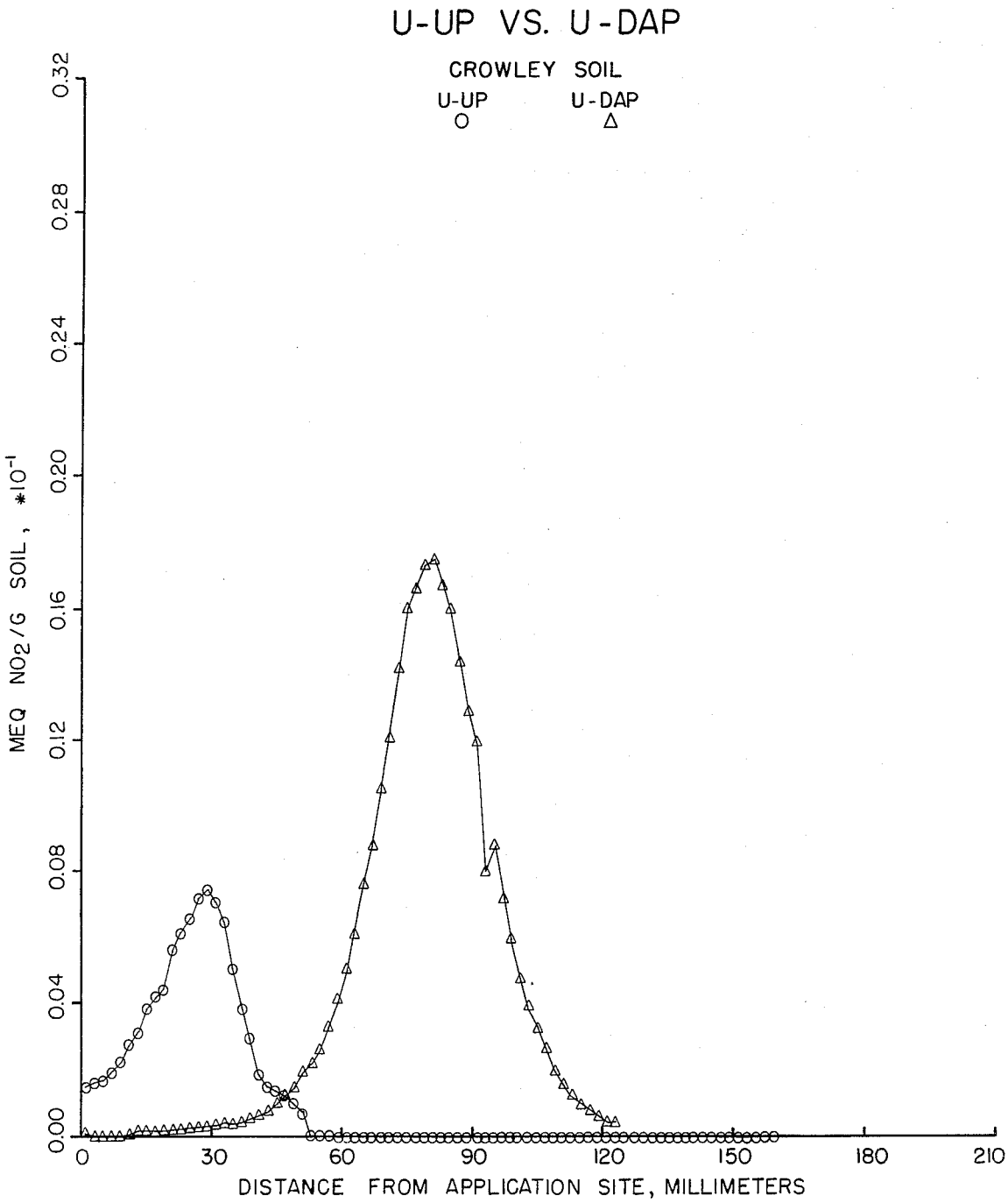
Figure 6:
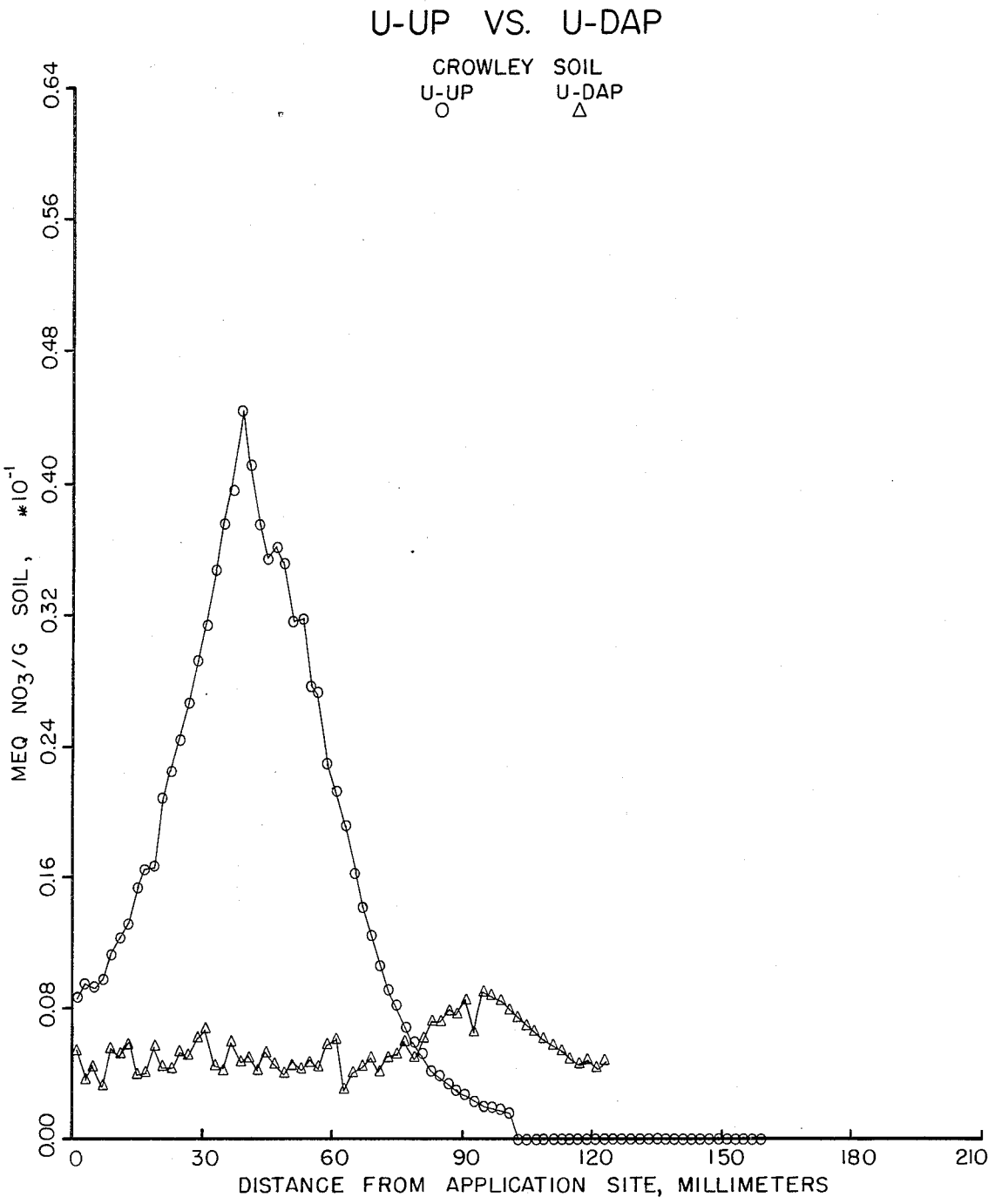
Figure 7:
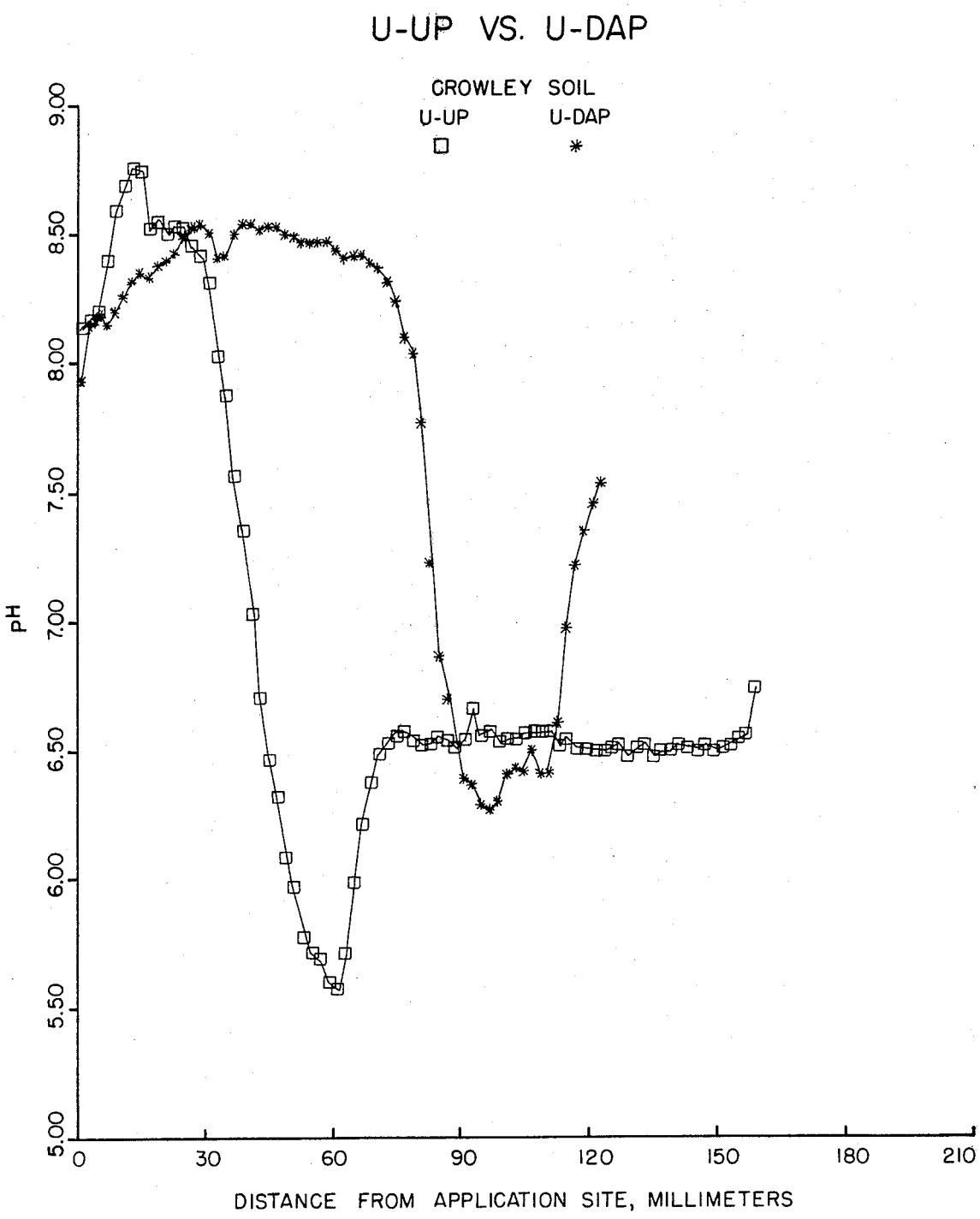
Figure 8:
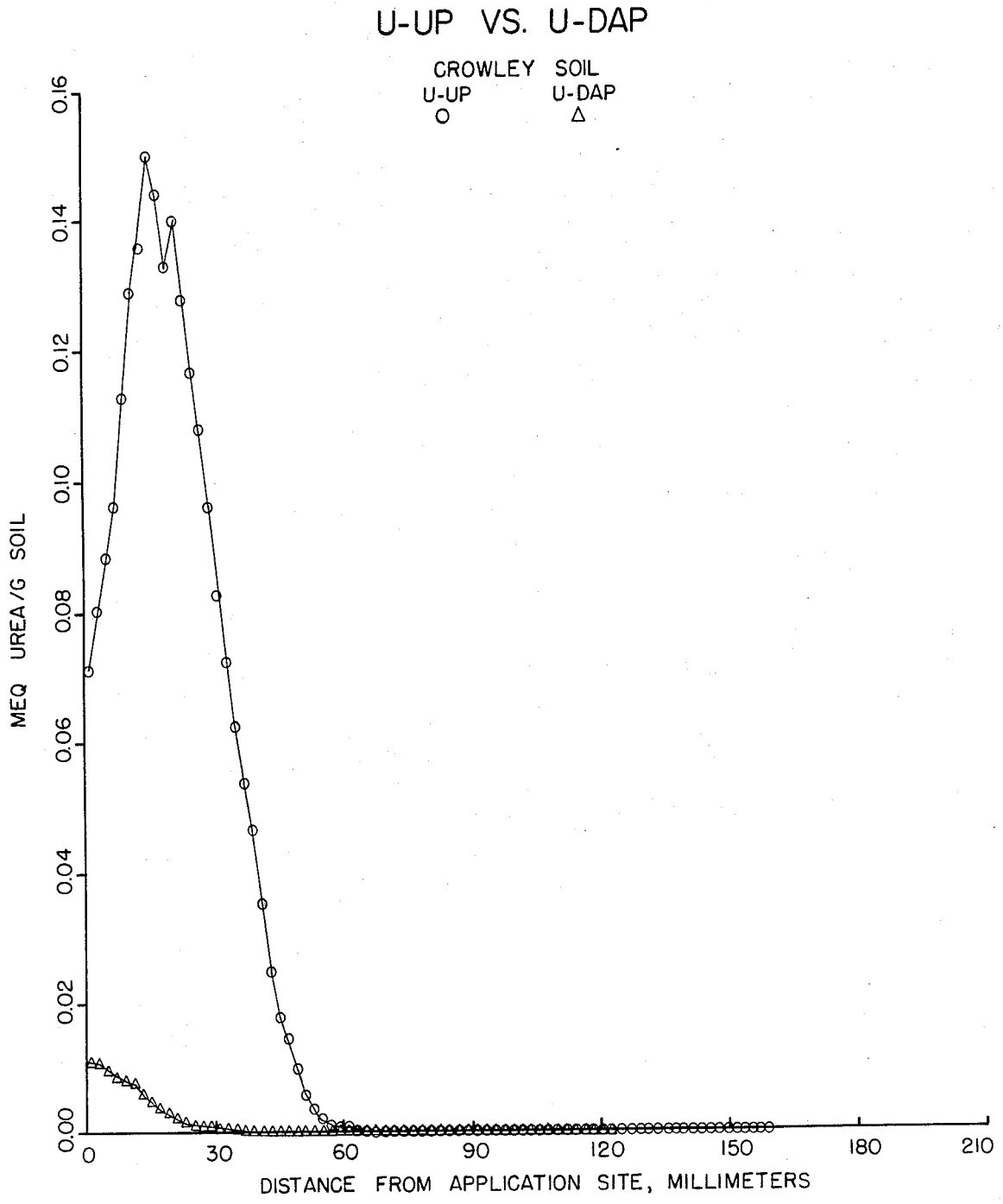
Figure 9:
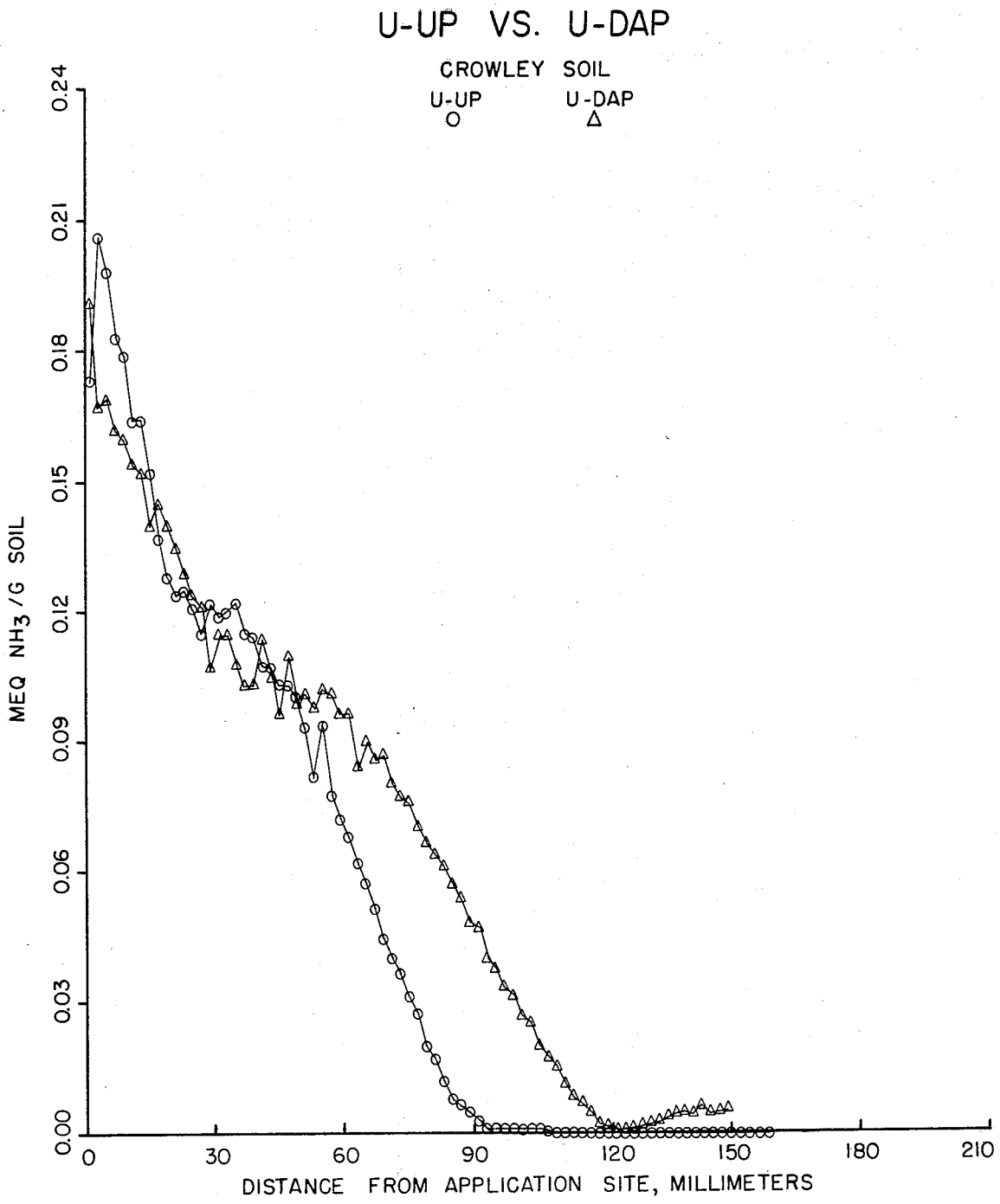
Figure 10:
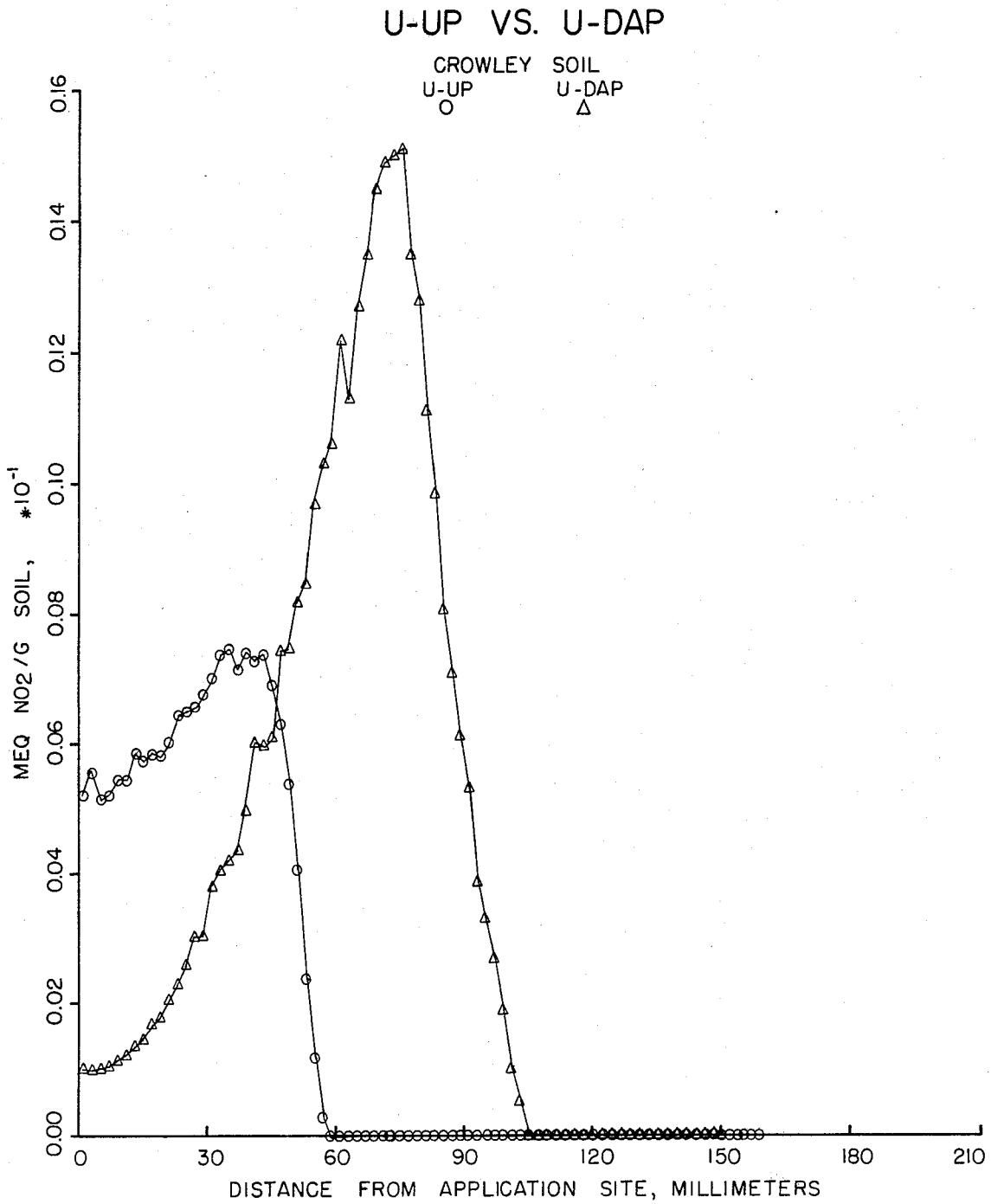
Figure 11:
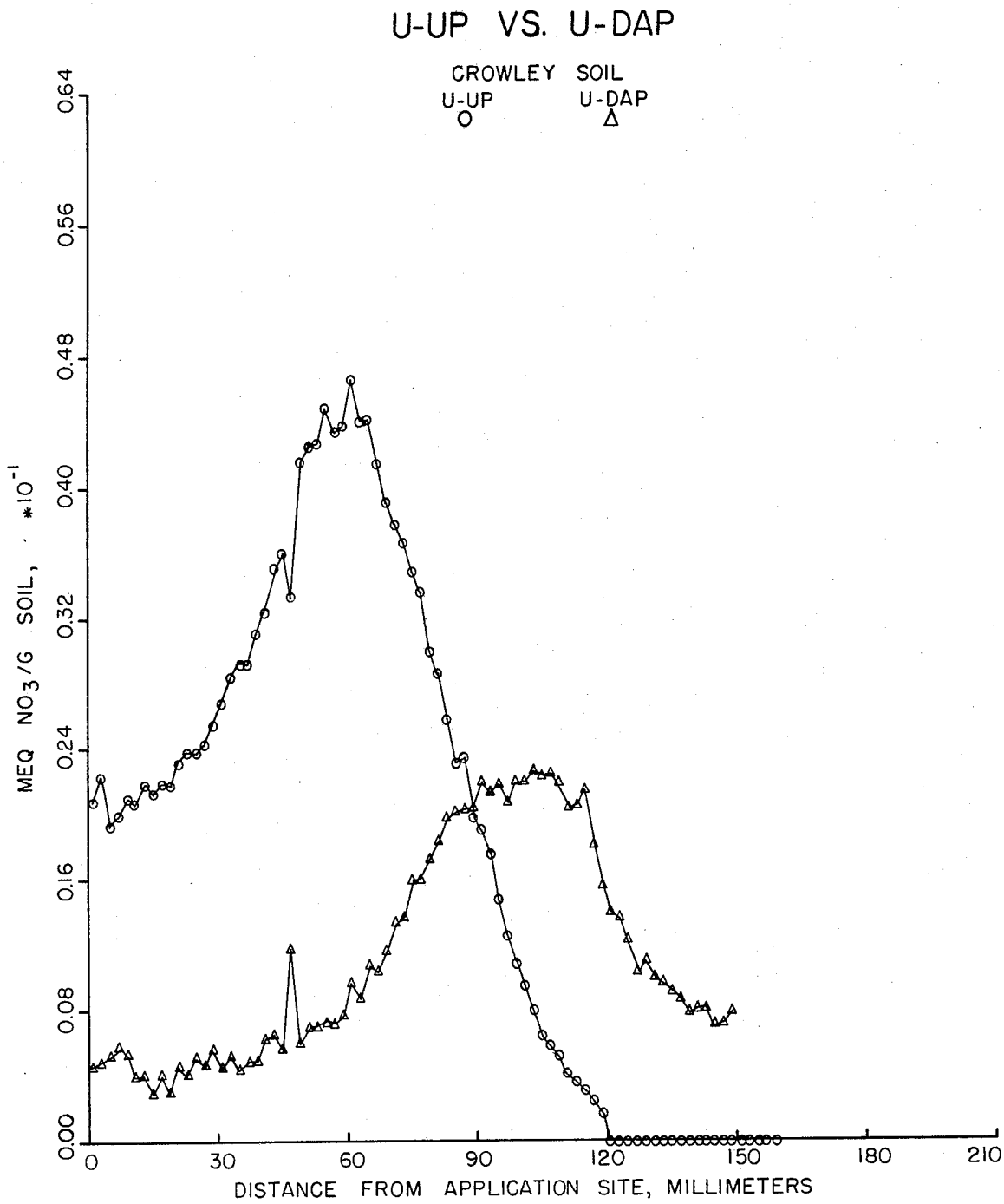
Figure 12:
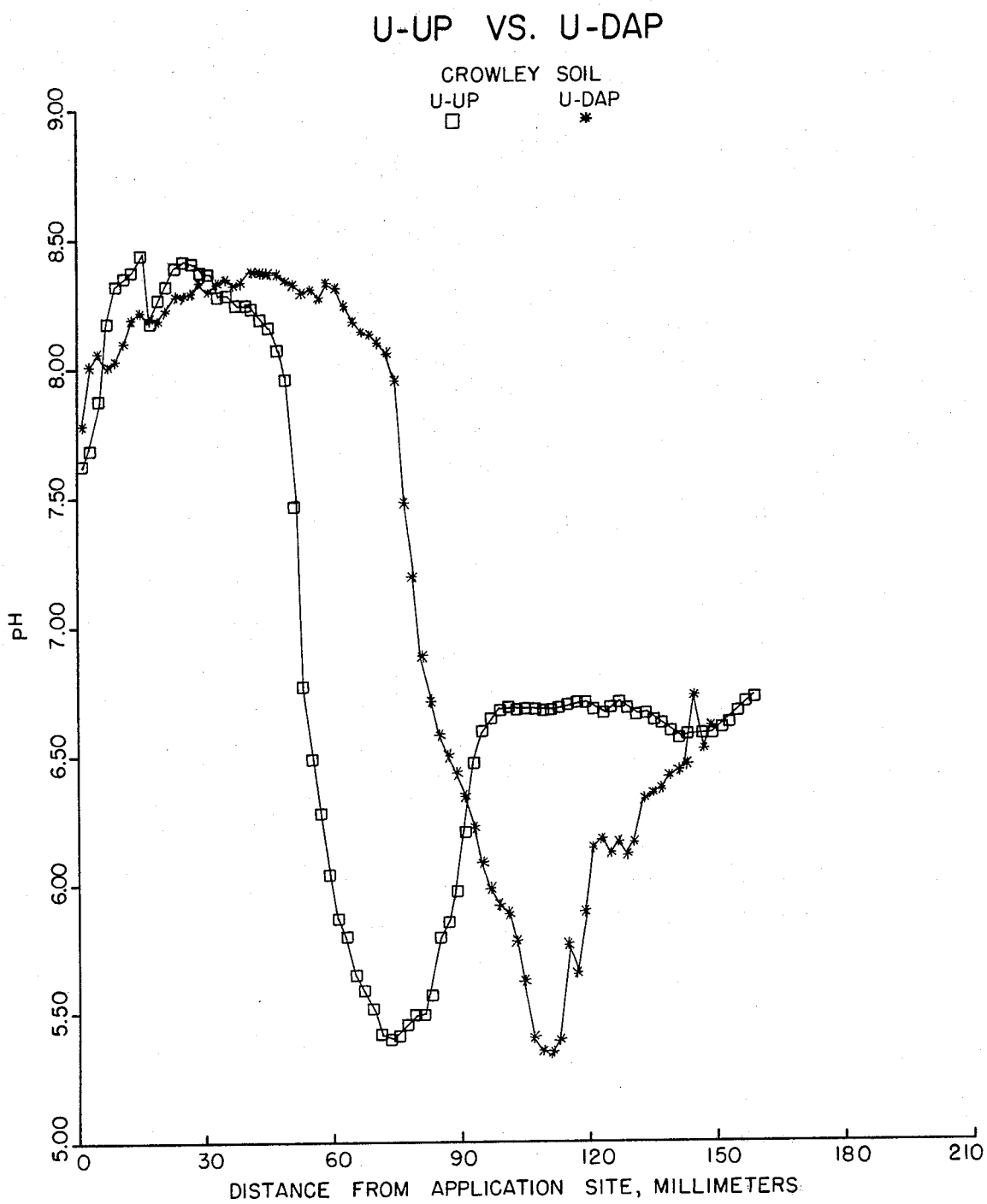
Figure 13:
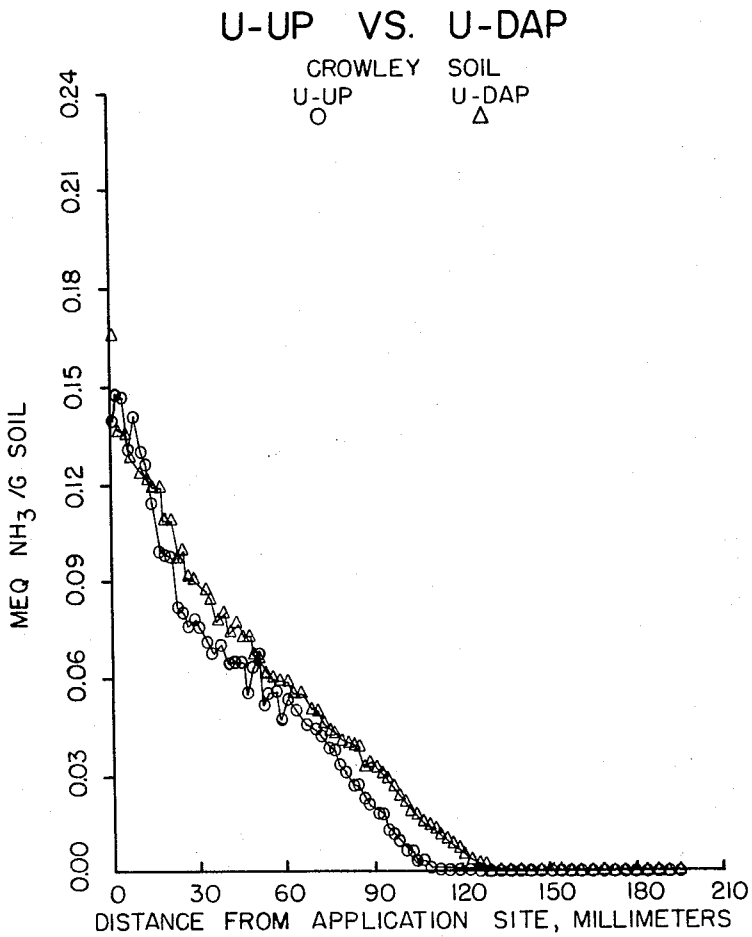
Figure 14:
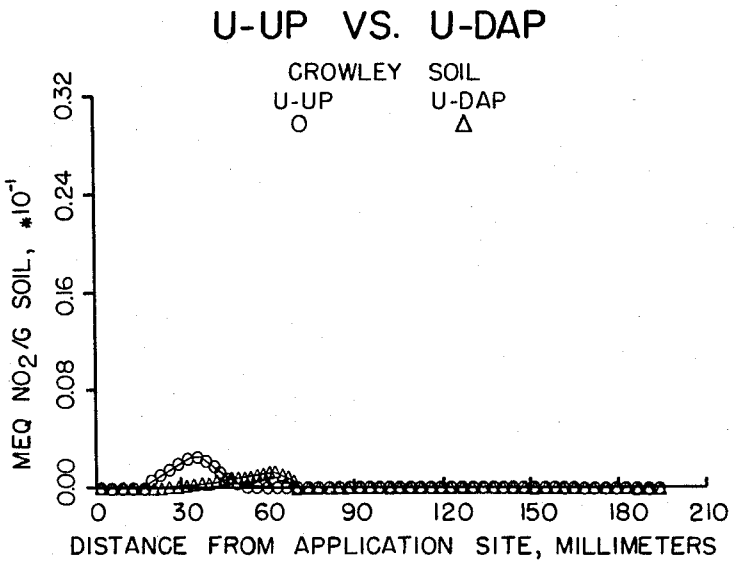
Figure 15:
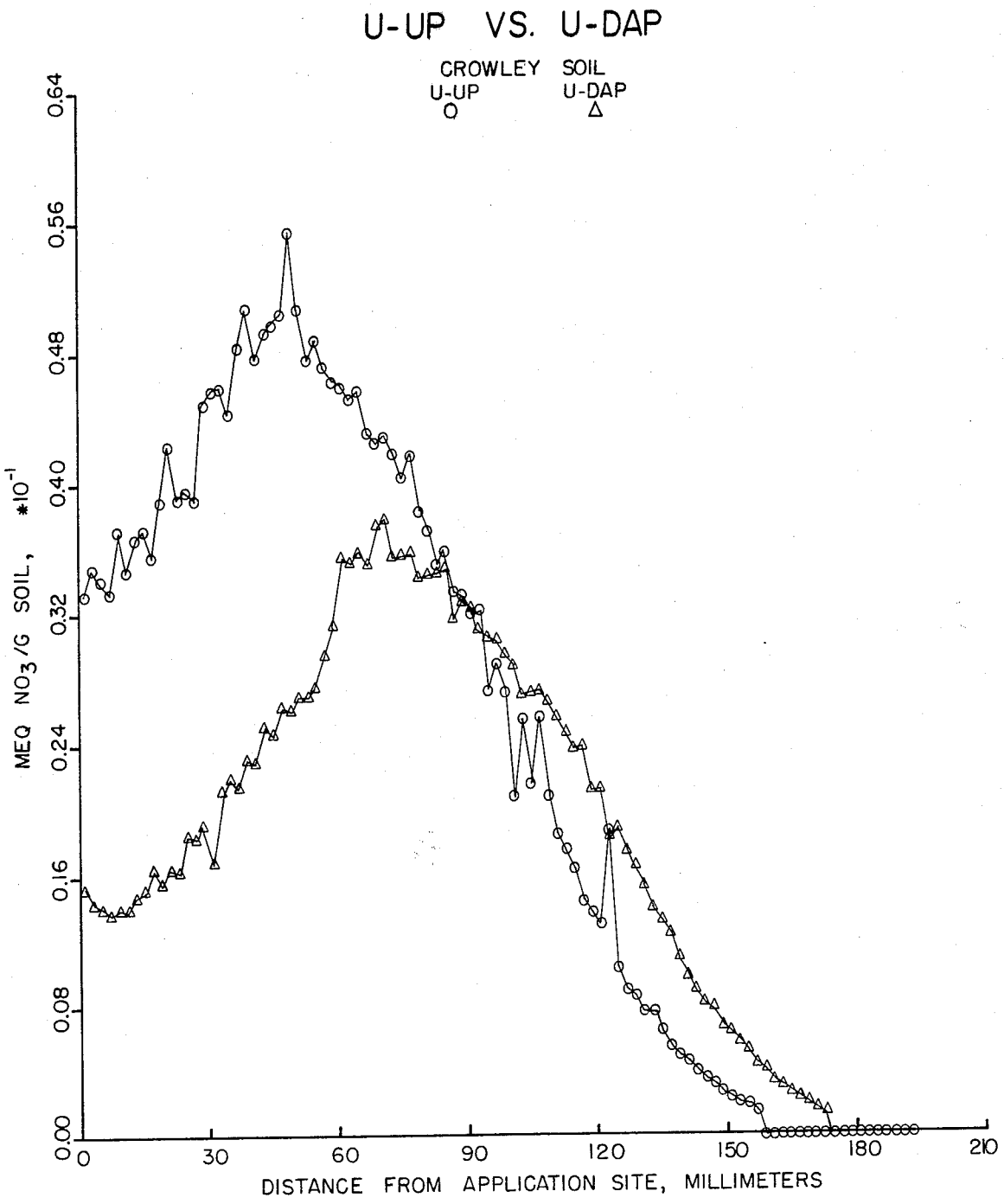
Figure 16:
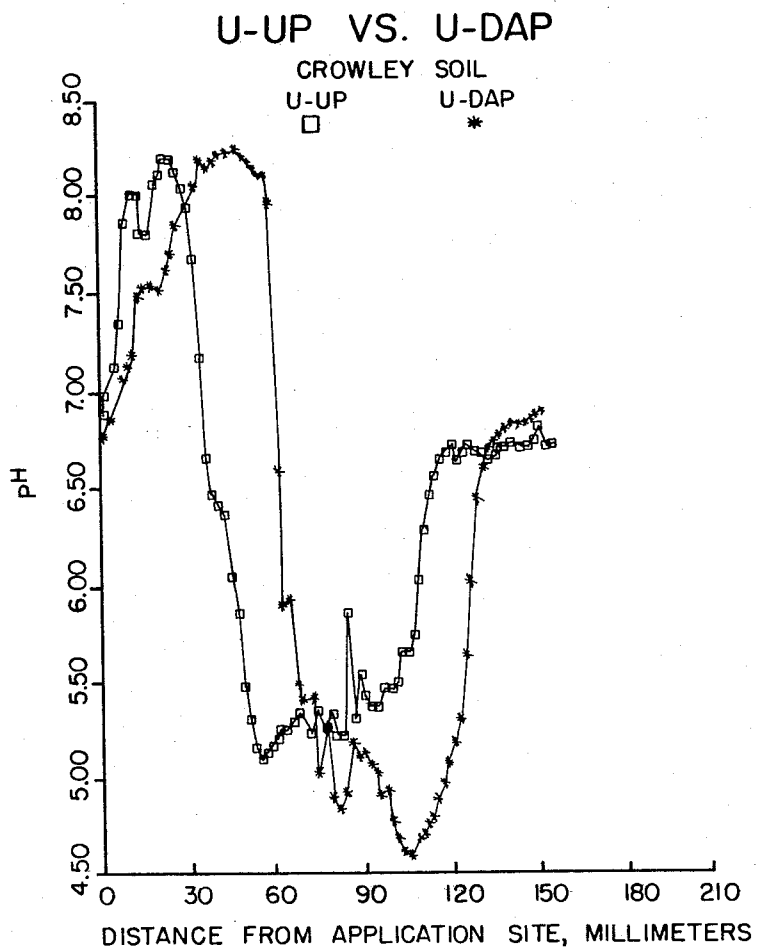

United States Defensive Publication [19] (H) [11] T102,902

Khasawneh [43] Apr. 5, 1983

[54] GRANULAR UREA - UREA PHOSPHATE FERTILIZER

[76] Inventor: Fayez E. Khasawneh, 329 Robinhood Dr., Florence, Ala. 35630

[21] Appl. No.: 308,875

[22] Filed: Oct. 5, 1981

[51] Int. Cl.[3] ..... C05C 9/00; C05C 7/08

[52] U.S. Cl. ..... 71/29; 71/902; 71/903

[57] ABSTRACT

Solid granular fertilizers based on the inclusion of phosphoric acid as an additive to urea and consisting of a homogeneous mixture of two solid crystalline phases, i.e., urea and urea phosphate, and ranging in its overall $N:P_2O_5$ weight ratio from about 2:1 to about 5:1, preferably from about 2:1 to 3:1. These fertilizers are suitable for surface application, especially where immediate incorporation into the soil is not practicable, such as on pastures, or undesirable such as in conjunction with reduced tillage practices, and generally wherever it is necessary or desirable to apply nitrogen on the surface of soil, ensuring substantially reduced losses of urea nitrogen by volatilization, and causing a delay of 4 to 7 days in the commencement of such losses. The product is also suitable for band application, resulting in eliminating the problems of seedling damage and crop stand reduction which are associated with urea or combinations of urea and ammonium phosphates, particularly diammonium phosphate.

10 Claims, 16 Sheets Drawing,

26 Pages Specification

The file of this unexamined application may be inspected and copies thereof may be purchased (849 O.G. 1221, Apr. 9, 1968).

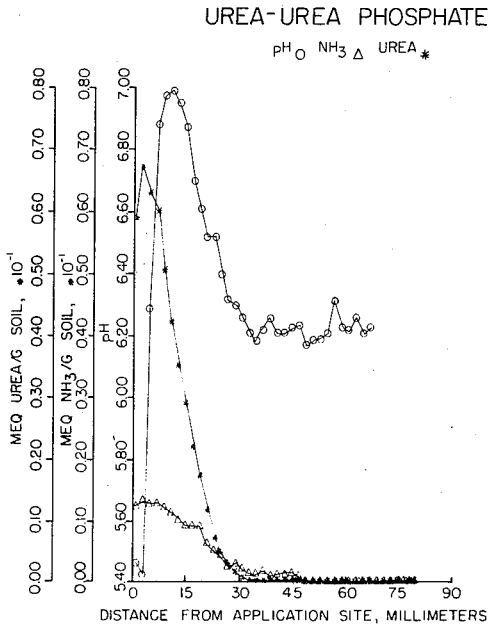

PROFILE OF UREA, $NH_3$, AND pH AFTER TWO DAY INCUBATION 0.100 G OF 35-17-0 WAS ADDED TO A COLUMN OF CROWLEY SOIL

PROFILE OF UREA, $NH_3$, AND pH AFTER TWO DAY INCUBATION 0.100 G OF 35-17-0 WAS ADDED TO A COLUMN OF CROWLEY SOIL $NH_3$ PROFILE AFTER 2 WEEKS INCUBATION

PROFILES OF $NH_3$ (aq) AFTER 2 WEEKS INCUBATION $NO_2$ PROFILE AFTER 2 WEEKS INCUBATION $NO_3$ PROFILE AFTER 2 WEEKS INCUBATION pH PROFILE AFTER 2 WEEKS INCUBATION

UREA PROFILE AFTER 2 WEEKS INCUBATION $NH_3$ PROFILE AFTER 4 WEEKS INCUBATION $NO_2$ PROFILE AFTER 4 WEEKS INCUBATION $NO_3$ PROFILE AFTER 4 WEEKS INCUBATION pH PROFILE AFTER 4 WEEKS INCUBATION $NH_3$ PROFILE AFTER 8 WEEKS INCUBATION $NO_2$ PROFILE AFTER 8 WEEKS INCUBATION $NO_3$ PROFILE AFTER 8 WEEKS INCUBATION pH PROFILE AFTER 8 WEEKS INCUBATION